United States Patent [19]
Martinez et al.

[11] Patent Number: 6,009,553
[45] Date of Patent: Dec. 28, 1999

[54] ADAPTIVE ERROR CORRECTION FOR A COMMUNICATIONS LINK

[75] Inventors: Dennis Martinez, Westford, Mass.; Thomas Hengeveld, Hollis, N.H.; Michael Axford, Groton, Mass.

[73] Assignee: The Whitaker Corporation, Wilmington, Del.

[21] Appl. No.: 08/991,587

[22] Filed: Dec. 15, 1997

[51] Int. Cl.$^6$ ................................................. H03M 13/00
[52] U.S. Cl. ......................... 714/784; 714/758; 714/782; 714/786; 370/33
[58] Field of Search ................................. 714/784, 748, 714/749, 758, 785, 782, 789, 786, 708; 375/341, 340, 377; 370/253, 395, 468

[56] References Cited

U.S. PATENT DOCUMENTS

| | | | |
|---|---|---|---|
| 4,131,849 | 12/1978 | Freeburg et al. | 375/216 |
| 4,517,669 | 5/1985 | Freeburg et al. | 370/329 |
| 4,519,068 | 5/1985 | Krebs et al. | 370/329 |
| 4,590,473 | 5/1986 | Burke et al. | 340/825.52 |
| 4,636,791 | 1/1987 | Burke et al. | 340/825.52 |
| 4,644,351 | 2/1987 | Zabarsky et al. | 340/825.44 |
| 4,737,978 | 4/1988 | Burke et al. | 455/438 |
| 4,829,519 | 5/1989 | Scotton et al. | 714/708 |
| 4,887,265 | 12/1989 | Felix | 370/333 |
| 4,918,446 | 4/1990 | Yagi | 714/789 |
| 5,544,170 | 8/1996 | Kasahara | 370/253 |
| 5,671,255 | 9/1997 | Wang | 375/341 |

OTHER PUBLICATIONS

CDPD System Specification Release 1.1, Jan. 19, 1995, Part 400 Overview of the Airlink, pp. 400–1 thru 400–8.
CDPD System Specification Release 1.1, Jan. 19, 1995, Part 401 Airlink Physical Layer, pp. 401–1 thru 409–50.
CDPD System Specification, Release 1.1, Jan. 19, 1995, Part 507, Mobile Network Registration Protocol, pp. 507–1 thru 507–11.
CDPD System Specification, Release 1.1, Jan. 19, 1995, Part 402, Medium Access Control, pp. 402–1 thru 402–52.
Memorandum to Chris Wilcox, from Bill Haymond, of MPR Teltech Ltd., Dated Dec. 23, 1993, subject: Possible CDPD Infringement of Motorola Patents, pp. 1–5.

*Primary Examiner*—Emmanuel L. Moise

[57] ABSTRACT

A method of data transfer between a transmitter and a receiver over a communications link achieves maximum throughput by dynamically adapting a coding rate, and specifically an error correction encoder, as a function of a measured reverse channel signal parameter. The method comprises the steps of transmitting a signal from the transmitter to the receiver, the receiver receiving and measuring the signal to noise ratio of the transmitted signal. The receiver determines an appropriate code rate and encoding technique as a function of the measured signal to noise ratio and transmits an encoding identifier of the determined encoder to the transmitter. The transmitter encodes its data according to the encoding identifier and transmits the encoded message to the receiver. The receiver receives the encoded message and decodes the message according to the determined code rate and encoding technique.

24 Claims, 4 Drawing Sheets

ADAPTIVE ERROR CORRECTION FOR A COMMUNICATIONS LINK

FIELD OF THE INVENTION

The present invention relates to a method of communication over a communications link and more particularly to a method of encoding and transmitting data over an established communications link.

BACKGROUND OF THE INVENTION

In an effort to increase the utility of wireless communications, advances have been made to improve the probability of transmission and receipt of error free or error correctable information. It is known that data blocks transmitted over a communications link may be encoded with one of an available plurality of error correcting encoders. The data block is encoded by the transmitting device according to a known algorithm, for example a Reed-Solomon encoder. The encoded data block is received by a receiving device which then decodes the data according to an appropriate error correcting decoder. In this case, both the transmitting device and the receiving device have a priori knowledge of the error correction coding that is in use. Advantageously, if one or more bits in the transmitted data block is corrupt, the decoder used at the receiving device may detect and correct the corrupted bits, thereby allowing use of the transmitted data block. Error correction encoders/decoders are used to increase the throughput of the communications channel by obviating the need to discard and retransmit corrupted data blocks. Disadvantageously, in order to transmit an encoded data block, a portion of the data block is used as overhead in order to transmit the information for use in decoding the subject data block. Accordingly, the portion of the data block used to transmit error correcting encoding information cannot be used to transmit bits of information, thus reducing the throughput of the communications link. The reduction in the amount of data transmitted on a per data block basis due to the error correcting overhead is, however, worthwhile in view of the increase in average throughput over time due to the ability to use data blocks that would otherwise be discarded and retransmitted.

Wireless communication is used in many areas including mobile telephone, wireless LAN, and mobile voice and data networks. Wireless communications are also used in applications where both the transmitter and the receiver are physically stationary such as digital TV. One known type of communications protocol provides access to the transmission channel without use of a reservation protocol. An example of this type of communications protocol known in the wireless communications industry is the CDPD Communication System protocol for mobile devices communicating with a base station and is defined by the CDPD System specification Release 1.1 , January 1995, the contents of which are specifically incorporated by reference herein. As defined in Part 402 of the CDPD System Specification "Medium Access Control", Section 4.6, pages 402–21 through 402–24, reverse channel message blocks, which are defined as a series of data blocks transmitted from a mobile to a base station, are Reed-Solomon (63,47) encoded to improve the probability of successful transmission. Each forward and reverse channel message block is encoded based on a (63,47) Reed-Solomon code generated over a 64 bit Galois Field GF(64). The code word is based on 6-bit symbols. The information field consists of 47 6-bit symbols, comprising 282 bits, and the generated parity field consists of 16 6-bit symbols, comprising 96 bits, for a total encoded block comprising 378 bits. While the error correcting encoded data blocks provide for a more robust data transmission, the encoding scheme applied to all of the data blocks results in some sacrifice in channel throughput as compared to the theoretical maximum throughput value. In other cases, the (63,47) Reed-Solomon encoding is insufficient for successful transmission and results in a discarded transmission and retransmission. Retransmission of message blocks also adversely affects channel throughput.

Since maximizing channel throughput permits increased channel traffic without an increase in communication system infrastructure, it is desirable and cost effective to maximize channel throughput.

Another known communications link that provides access to the channel through a channel arbitration process uses a (63,45) Reed-Solomon error correction encoder for transmitted data blocks. Where CDPD controls access to the reverse channel using a slotted non-persistent Digital Sense Multiple Access with Collision Detection (DSMA/CD) method, other communications links include a direct channel arbitration method whereby the mobile requests access to the reverse channel and does not initiate a transmission of a data block on the reverse channel until the request for access to the channel is granted by the base station. Both types of communications links benefit from error correction, the optimum type and level of error correction being a function of the specific wireless network. Both types of communications links optimize average channel throughput by trading off instantaneous channel throughput in exchange for a more robust transmission by dedicating some of the data block in each datablock transmission to error correction overhead. Both types of communications links would benefit from maximizing information throughput.

There is a need, therefore, for a method to maximize the efficiency of the available bandwidth and throughput.

SUMMARY OF AN EMBODIMENT OF THE INVENTION

It is an object of an embodiment of the present invention to maximize the throughput in a communications link.

It is another object of an embodiment of the present invention to increase the range of operation of a mobile communications device without decreasing channel throughput.

A method of data transfer between a mobile and a base station over a communications link comprises the steps of the mobile transmitting a signal and the base station receiving and measuring the signal. The base station determines an error correction algorithm as a function of the measured signal and transmits the determined error correction algorithm to the mobile. The mobile encodes a message according to the determined error correction algorithm and transmits the encoded message. The base station receives the encoded message and decodes the message according to the determined error correction algorithm.

A method of data transfer between a transmitter and a receivers the transmitter and receiver having similar a priori knowledge of a plurality of error correction levels and the encoding information associated with the error correction levels comprising the steps of encoding a data block according to a first predetermined error correction level. The transmitter transmitting the encoded data block and the receiver receiving the encoded data block. Decoding the data block according to the first error correction level and determining whether the data block is successfully decoded. The receiver indicating to the transmitter whether the step of decoding the data block was successful or not and the transmitter changing the error correction level to a second error correction level if the step of decoding was not successful. The transmitter changing the error correction level to a third error correction level if the step of decoding was successful.

It is an advantage of an embodiment according to the teachings of the present invention that the channel throughput in a communications link is maximized.

It is an advantage of an embodiment according to the teachings of the present invention that the range of a mobile device is increased without adversely affecting the overall channel throughput.

BRIEF DESCRIPTION OF THE DRAWINGS

Embodiments of the invention will now be described by way of example and with reference to the accompanying drawings in which.

DETAILED DESCRIPTION OF EMBODIMENTS OF THE INVENTION

Figure 1:
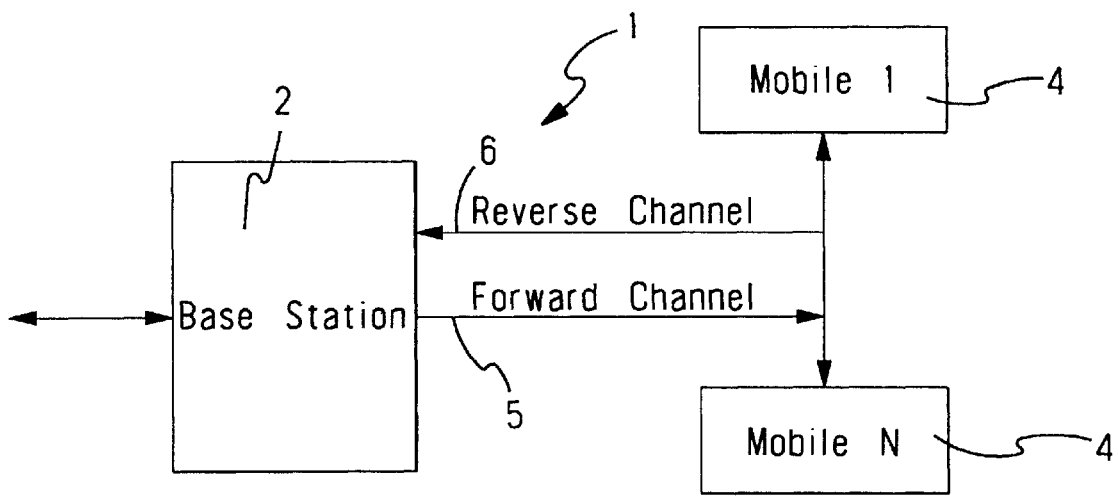
FIG. 1 is a conceptual view of a communications link between a mobile and a base station for a full duplex embodiment of a system according to the teachings of the present invention.
Figure 2:
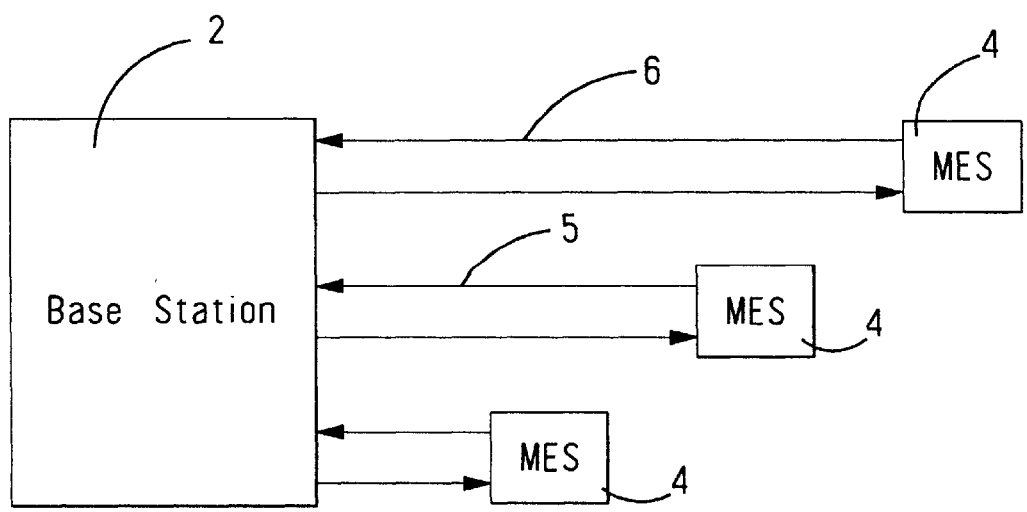
FIG. 2 is a conceptual view of a plurality of mobiles communicating over the communications link with a single base station.

With specific reference to FIGS. 1 and 2 of the drawings, there is shown a base station (2) ("BS") having bi-directional communication with a plurality of mobile end stations (4) ("MES") over an established communications link (1). The communications link (1) comprises a forward channel (5) in which the base station (2) transmits information to the mobile (4) and a reverse channel in which the mobile (4) transmits information to the base station (2). In a preferred embodiment, the forward and reverse channels (5,6) occupy different bands of the spectrum, with the carrier signals separated by 45 MHz, providing full-duplex communication. RF communication is achieved using frequency modulated four level Gaussian Frequency Shift Keying (GFSK), although any other modulation scheme may also be used without departing from the scope of the present invention. In a specific embodiment, the mobile (4) comprises a half-duplex radio and the base station (2) comprises a full-duplex radio. Alternate communication links are also appropriate for the present invention such as a single frequency band for both the forward and reverse channels using half-duplex radios for both the mobile (4) and the base station (2) and multiple frequency bands wherein both the mobile (4) and the base station (2) comprise full duplex radios. Both the mobile (4) and the base station (2) act as both a receiver and a transmitter. With respect to the teachings of the present invention, the transmission method could be implemented by either the mobile (4) or the base station (2). In the disclosed embodiments for a communications link having a channel arbitration process, the specific disclosure is in the context of the mobile (4) acting as the device transmitting the data block, and may be termed "a transmitter", and the base station (2) acting as the device receiving the data block, and may be termed "a receiver". For purposes of clarity and for disclosure of a specific embodiment according to the teachings of the present invention, the terms mobile 4 and base station (2) are used, and in no way limit the scope of the claimed invention.

The base station (2) communicates with multiple mobiles (4) that are geographically located within a cell (15), which is defined by a range of the mobile or the base station (2), whichever range limits the overall communication. A "range" is defined as the distance between which any one mobile (4) and a base station (2) can maintain a bi-directional communications link. The base station (2) generally has a higher signal transmission power, 75–100 Watts for example, as compared to the transmission power of the mobile (4), 15–30 Watts and 0.6–3.0 Watts for example. Accordingly, there is a higher likelihood, although not in all cases, of a successful transmission from the base station (2) to the mobile (4) than the mobile (4) to the base station (2). In a specific embodiment, the base station (2) encodes forward channel message blocks (17) with a (63,45) Reed-Solomon encoder. The encoded forward channel message blocks are received and decoded by each mobile (4). Each mobile (4) may be programmed to decode any parity check or error correction encoder, the (63,45) Reed-Solomon encoder being described for illustration of a specific embodiment by way of example. The mobile (4) adaptively changes the message block coding rate as a function of measured channel characteristics. "Coding rate" is defined as a ratio of data bits relative to the total number of bits in a data block, and is always a number less than 1 and is a relative indication of overhead in a message block (18,20) transmission. In a specific example, the mobile (4) adaptively implements a (63,63-m) Reed-Solomon encoder for the reverse channel message blocks (18) in order to improve the transmission success rate from the specific mobile (4) to the base station (2). Each mobile (4) in the cell adapts its coding rate, independent of all other mobiles (4), based upon the measured signal characteristics associated with each specific mobile. Accordingly, the mobile (4) that is near to the base station (2) having a high quality communications signal has a higher coding rate and the mobile (4) far from base station having a low quality communications signal has a lower coding rate. The adaptation of the error correcting encoder is based upon signal characteristics of the reverse channel, specifically signal to noise ratio, as measured by the base station (2) and the predicted requirement of the level and/or type of error correction required for acceptable probability of a successful transmission. As an example, in order to correct up to (8) symbol errors in a (63) symbol message block transmission, 18 parity symbols are used and a (63,45) Reed-Solomon encoder is appropriate. In the (63,45) Reed-Solomon encoder, if (63) symbols are transmitted in a single message block, (45) of the symbols carry data information (23) content, and the remaining 18 symbols are error encoding/decoding information and represent overhead (24) Not all 18 symbols, however, are always needed. At any one point in time, a mobile (4) may be near to the base station (2) where the transmitted reverse channel signal is likely to have a relatively large signal to noise ratio and a relatively low number of transmission errors. In this case, a lower coding rate and thereby a lower order error correction level is appropriate, such as the (63,55) Reed-Solomon encoder, in order to increase the number of data symbols, 55 symbols in the example, and increase the throughput of the channel. Another one of the mobiles (4) may be far from the base station (2) where the transmitted reverse channel signal is likely to have a relatively low signal to noise ratio and a relatively high number of transmission errors. In this case, a higher coding rate and thereby a higher order error correction level is appropriate, such as (63,37) Reed-Solomon encoder, because the decreased amount of data symbols (23) contained in the single message block transmission due to the error correction overhead (24) is worthwhile in order to increase the probability of a successful transmission and decrease the probability of a retransmission of the specific message block. For the example having a low signal to noise ratio for the reverse channel as measured by the base station (2), the increased overhead in each data block effectively increases the information throughput by improving the transmission reliability of each message block (18) that is sent. A fixed order error correction data encoder adapted to correct the maximum number of errors expected, therefore, is not useful for all of the mobiles (4) in the cell (15) and does not make most efficient use of the available bandwidth of the channel. Advantageously, the method according to the teachings of the present invention increases the throughput and the range of the transmitting device by dynamically adapting coding rate to the signal transmission quality of each mobile. The method, therefore, accommodates a broader range of signal transmission quality without sacrificing the data throughput for those mobiles operating under excellent signal conditions.

Generally, the number of errors in a transmission is directly related to the signal to noise ratio of the transmitted signal. The present invention proposes to dynamically adapt the type and/or level of error correction for the transmission of a data block as a function of a measured channel parameter, for example the signal to noise ratio of the received signal. The signal to noise ratio measurement may comprise a power measurement and may be made prior to signal detection. Alternatively, and in a preferred embodiment, the signal to noise ratio is made after the transmitted signal is demodulated and decoded. Signal to noise is measured as an average of the value of the departure of each received symbol from the nominal. In instances of a relatively low signal to noise ratio, a large number of errors is expected. Accordingly, the coding rate is decreased and a relatively larger portion of the data block is used as overhead to transmit error correction information. In instances of a relatively high signal to noise ratio, a small number of errors is expected. Accordingly, the coding rate is increased and a relatively smaller portion of the data block is used to transmit error correction terms. The error correction overhead is, therefore, dynamically configured as a function of the relative need for the amount of error correction to be performed.

Figure 3:
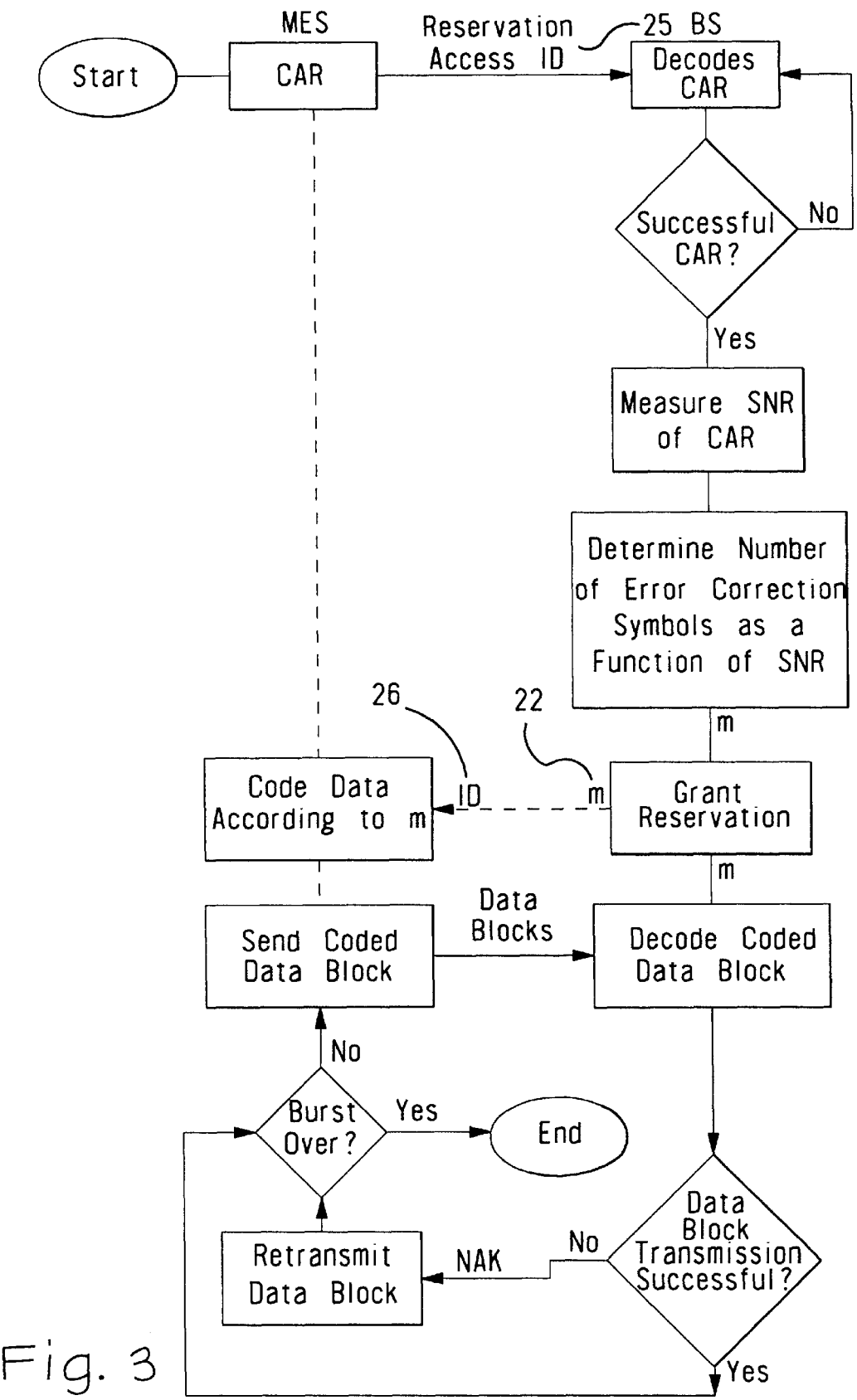
FIG. 3 is a slow chart of a method of adaptively determining an appropriate data encoder for a data block transmission according to the teachings of the present invention in a communications link utilizing reverse channel arbitration.
Figure 4:
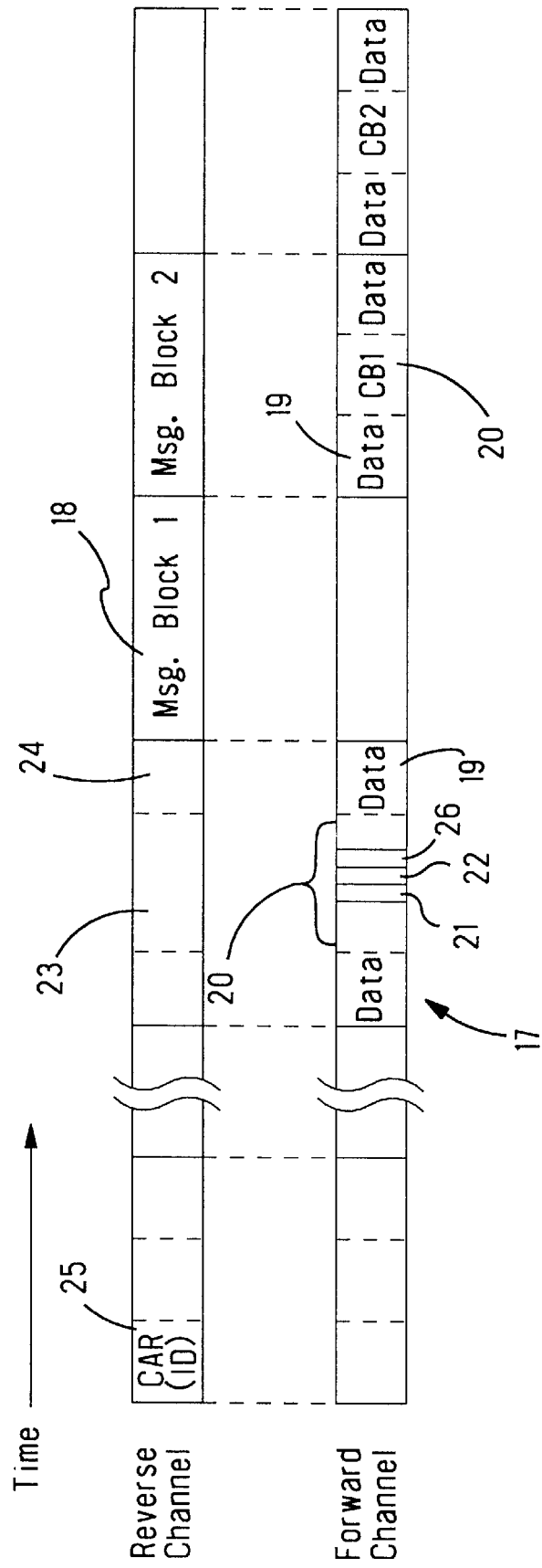
FIG. 4 is a diagrammatic view of forward and reverse channel message blocks and their relative position in time for the embodiment according to the teachings of the present invention and as shown in FIG. of the drawings.

With specific reference to FIGS. 3 and 4 of the drawings, there is shown a logical representation of forward and reverse channel message blocks (17,18) respectively. Each forward and reverse channel message block (17,18) is 30 msec in duration. The forward and reverse channel message blocks (17, 18) are synchronous and are logically related in that the forward channel message block (17) 30 msec subsequent in time to the reverse channel message block (18) contains status information regarding the results of the transmission of the reverse channel message block (18). The reverse channel message block 18 and the forward channel message block (17) 30 msec prior in time represent a round trip, i.e. a mobile's (4) transmission and a base station (2) response to the transmission, in the communications link 1 between the mobile (4) and the base station (2).

The forward channel message block (17) is transmitted to all mobiles (4) in the cell (15). All mobiles (4) contend for the opportunity to transmit to the base station (2) on the reverse channel (6) using one or more of the reverse channel message blocks (18). Each reverse channel message block (18), therefore, contains information content for only one mobile (4). The base station (2) transmits continuously over the forward channel (5) to all of the mobiles (4) in the cell (15) regardless of whether there is information to convey in order to maintain a communications link (1). The forward channel control block (20) consistently contains information used by all mobiles (4) in the cell (15)

Each forward channel message block (17) has two data blocks (19) separated in time by a control block (20). The two data blocks (19) are related in that they are logically grouped as a single block of data transmitted by the base station (2). The data blocks (19) contain digital information content. The control block (20) represents forward channel message block overhead and contains administrative information used by the mobile (4) to perform certain functions including channel access arbitration.

Each mobile (4) attempts to transmit only when it has information to convey to the base station (2). Arbitration of the reverse channel contention is performed by way of a reservation process. A portion of the control block (20) comprises a reverse channel busy status (21) (termed a "busy bit"). Typically, the mobile (4) is listening to transmissions from the base station (2) over the established communications link (1) and continuously reads and interprets information contained in each control block (20). The reverse channel (6) is often quiet and not transmitting reverse channel message blocks (18). When the mobile (4) wishes to transmit information to the base station (2), the mobile (4) monitors the value of the busy bit (21). A busy bit (21) having a zero(0) value indicates that the next 30 msec reverse channel message block (18) is unreserved ("IDLE") and will not be used by one of the mobiles (4) in the cell (15) to transmit information on the next reverse channel message block adjacent in time. Seeing that the next reverse channel message block (18) is free, the mobile (4) wishing to transmit information first sends a Channel Access Request ("CAR") over 1 of 3 randomly selected 10 msec adjacent logical microslots in the next reverse channel message block (18). As can be appreciated by one of ordinary skill in the art, when the reverse channel message block (18) is used to transmit a CAR to the base station (2), it is not used to transfer information content. Advantageously, up to three mobiles (4) are able to send a CAR on one of the reverse channel message blocks (18) The CAR comprises a randomly generated twelve bit reservation access identifier (25). When the base station (2) receives the CAR, it decodes and stores the reservation access identifier (25) and measures the signal to noise ratio of the corresponding received CAR. The signal to noise ratio of the received CAR is a reliable indication of the expected signal to noise ratio of the transmission next in time coming from the mobile (4) that initiated the CAR. Based upon the value of the signal to noise ratio, the base station (2) makes a determination as to the appropriate number of (63,63-m) Reed-Solomon error correction symbols for a reverse channel message block (18)

to be transmitted by the mobile (4) at that time. As an example, for a signal to noise ratio of 15 dB for a received CAR, there is a reasonable probability to expect as many as 8 errors. Using a (63,63-m) Reed-Solomon function, there are 18 error correction symbols used to correct up to 8 errors, and the appropriate encoding is a (63,45) Reed-Solomon encoder. The number of error correction symbols used is designated by the letter "m" (22) in the present specification and in the flow chart of FIG. 3.

With specific reference to FIG. 3 of the drawings, the mobile (4) that sent the CAR constantly monitors the control block (20) of the subsequent forward channel message blocks (17). The base station (2) grants the reservation by sending a twelve bit reservation grant identifier (26) in the control block (20) on the forward channel (5). The reservation grant identifier (26) corresponds in value to the reservation access identifier (25) of the mobile (4) to which the reservation is granted. The base station (2) also sends in the control block (20), an encoding identifier (22). In a specific example, the type of encoding used is fixed and known and the encoding identifier (22) comprises the number of error correction symbols that the mobile (4) is to use. In this specific example, the coding type is a (63,63-m) Reed-Solomon encoder. When the mobile (4) recognizes the reservation grant identifier (26) in the control block (20) in response to its CAR and identifies it as equal to the value of the reservation access identifier (25) sent by the mobile (4), the mobile (4) also receives and decodes the encoding identifier (22), specifically the number of error correction symbols to use as denoted by the variable "m" in FIG. 3 of the drawings and as shown by reference numeral (22) in FIGS. 3 and 4 of the drawings. Based upon the number of error correction symbols to use, the mobile (4) encodes the information it has to transmit according to the specified (63,63-m) Reed-Solomon encoder and builds the reverse channel message blocks (18) accordingly. The mobile (4) transmits a burst of appropriately encoded data beginning in the next 30 msec reverse channel message block (18). Although the adaptive error correction may be performed on each block, in a specific embodiment the encoding is performed on a burst, a burst comprising up to eight consecutive message blocks (18) depending upon how much data the mobile has to convey. The base station (2) receives the series of message blocks (18). As the base station (2) maintains the information concerning the number of error correction symbols it directed the mobile (4) to use in its encoder as indicated in the encoding identifier (22), the base station (2) decodes and corrects each data block (18) in the burst according to the (63,63-m) Reed-Solomon decoder. The base station (2) assesses whether each reverse channel message block (18) transmission succeeded or failed. The control block (20) of the forward channel message block (17) that is 30 msec subsequent to the transmitted reverse channel message block (18) containing information, indicates a receipt status to the mobile (4) with an ACKnowledge (ACK) or a No AcKnowledge (NAK) informing the mobile (4) as to whether or not the information was properly received and decoded. If the reverse channel message block (18) transmission was successful, the mobile (4) encodes the reverse channel message block (18) that is to be transmitted next in time according to the same (63,63-m) Reed-Solomon function. If the reverse channel message block (18) transmission was unsuccessful, the base station (2) issues a NAK in the appropriate control block (20) to which the mobile (4) retransmits the reverse channel message block (18) in response. The mobile (4) transmits up to eight reverse channel message blocks in a burst and uses up to twelve consecutive 30 msec time slots to transmit the burst if one or more re-transmissions are necessary. During channel arbitration, instances exist when more than one mobile (4) initiates a CAR on the same microslot. In these instances, a collision occurs and both CARS are corrupted and are not received by the base station (2). If the initiating mobile (4) does not receive a reservation grant after a predetermined length of time, the mobile initiates another CAR in order to gain access to the reverse channel (6) and the communication flow proceeds as previously described.

Alternate embodiments according to the teachings of the present invention include measuring one or more reverse channel transmission parameters and determining a most appropriate one of a plurality of different error correction encoders as a function of the one or more measured reverse channel transmission parameters for a particular mobile (4). Alternate reverse channel transmission parameters include for example: absolute signal power, bit error rate and reverse channel transmission success rate. Alternate error correction algorithms include: BCH coding, Golay coding, and convolutional coding. In an alternate embodiment, the reservation grant includes the encoding identifier (22) which provides an indication of the type or level or type and level of error correction decoder to use. This embodiment is very general in that it provides the capability to dynamically adapt to any number of error correction algorithms depending upon specific characteristics of the reverse channel transmission. For example, the Reed-Solomon encoder is particularly effective for burst errors and the BCH encoder is particularly effective for random errors. Accordingly, a measurement that is indicative of the type of errors that are occurring will determine the most appropriate error correction encoder to use. An example of the implementation of an embodiment that can adapt to different coding rates and types of encoders comprises a method wherein there is a fixed number, for example six, of error correcting encoders: such as three levels of the Reed-Solomon encoder, such as (63,53) Reed-Solomon, (63,45) Reed-Solomon, and (63,37) Reed-Solomon corresponding to a low, medium, and high level of burst level error correction respectively and three levels of the BCH encoder (63,53) BCH, (63,45) BCH, and (63,37) BCH corresponding to a low, medium, and high level of random type error correction, respectively and providing a high, medium, low coding rate respectively. The base station (2) and the mobiles (4) have a priori knowledge of the predetermined error correction encoders as well as the encoding identifier associated with each of the 6 encoders which are stored in a tabular arrangement that may be accessed in a look up operation. The base station (2) measures absolute signal power of a received signal and makes a determination as to the appropriate type of error correction. Strong absolute signal power implies a Reed-Solomon encoder/decoder, while weak absolute signal power implies a BCH encoder/decoder. The base station (2) may make an additional measurement such as signal to noise ratio to assess the appropriate coding rate for the encoder selected. The reservation grant includes a symbol representing the determined encoding identifier (22), such as numeral from 1–6. The encoding is received and used by the mobile (4) to look up the appropriate encoding information which would include the coding type and the coding rate and encodes the subsequent reverse channel message block (18) accordingly. The determined encoding identifier (22) is also used by the base station to decode the received reverse channel message block (18). As one of ordinary skill in the art can appreciate, due to the tabular nature of this embodiment and the look up function performed by the base station (2) and the mobiles (4), relatively few bits are used as overhead in the control block (20) while permitting a broad range of available encoders Other error correction encoders are within the scope of the invention, the Reed-Solomon and BCH encoders being used by way of illustration.

Figure 5:
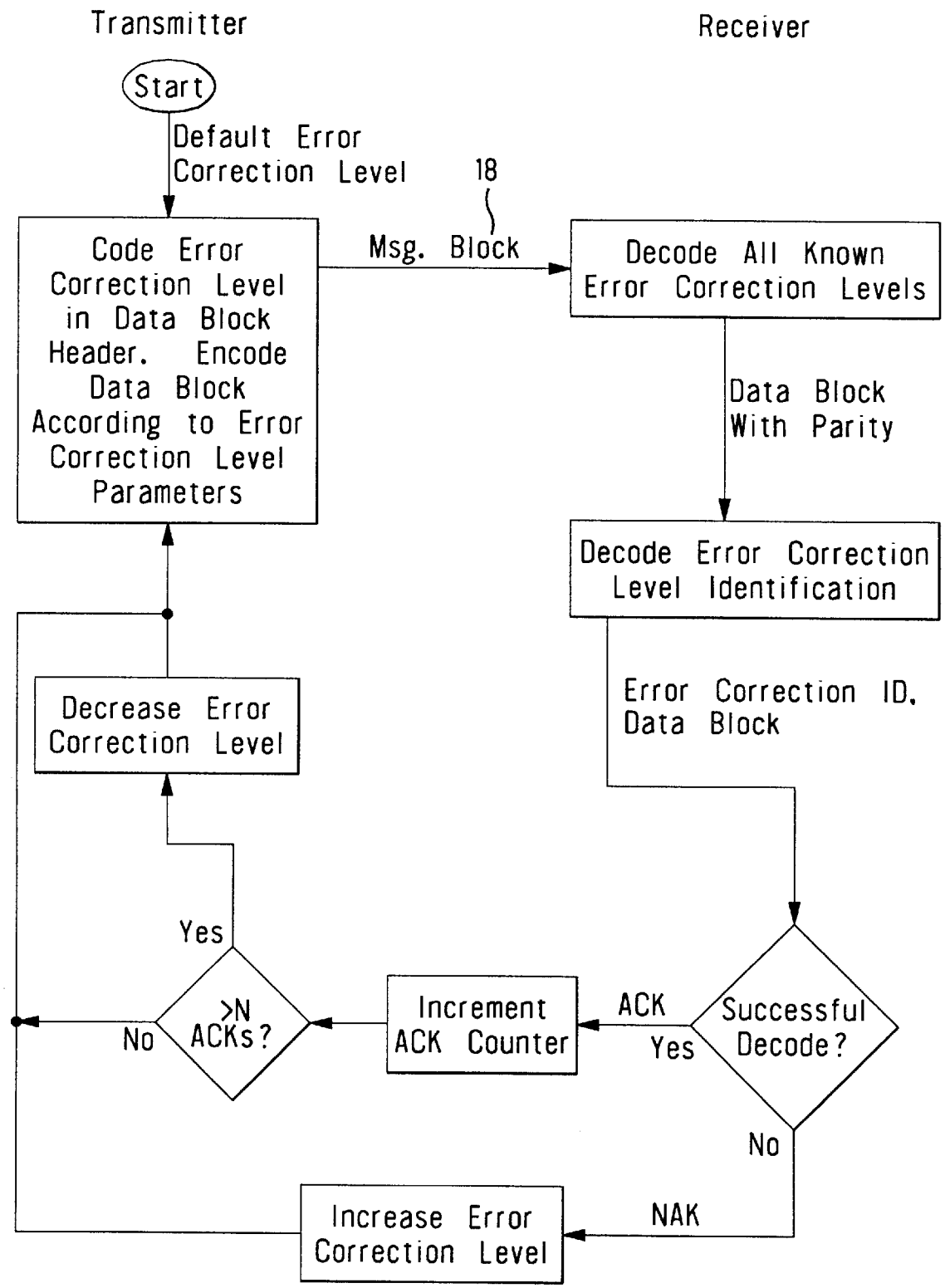
FIG. 5 is a flow chart of an alternate embodiment of a method of adaptively determining an appropriate data encoder for a data block transmission according to the teachings of the present invention in a communications link that does not use channel access request.

An alternate embodiment according to the teachings of the present invention includes provision for adapting an error correction algorithm for a system having a channel arbitration process that does not include a CAR and a reservation grant. In such a communications system; the teachings of the present invention may be implemented wherein there are a fixed plurality, three for example, of predetermined error correction levels, (63,55), (63,45), and (63,37) Reed-Solomon error correction encoder levels corresponding to low, medium, and high correction, available within the system. When the mobile (4) has data to transmit, it encodes and sends a reverse channel message block (18) according to a default one, medium or (63,45) Reed-Solomon for example, of the predetermined default error correction levels. Optionally, the transmitter may insert an error correction level identifier into a header of the message block for additional assurances as to proper decode. With specific reference to FIG. 5 of the drawings, the receiver (2) decodes the transmitted reverse channel message block (18) according to all of the predetermined error correction encoders and determines which error correction encoder(s) were decoded with correct parity. Presumably, only one of the correction level decode resulted in parity. It is possible, however, that more than one achieved parity in which case, only one is the encoder actually used. The result of the decoded message blocks having correct parity is further decoded to decipher the header bits containing the encoding identifier. The receiver (2) compares the error correction identifier against the error correction encoder(s) that achieved parity to determine whether there was a successful decode of the transmitted data block and which encoder used is identified in the error correction encoder identifier. If the decode process was successful, the receiver (2) acknowledges successful transmission to the transmitter with an ACK. The transmitter increments a counter and determines whether the counter exceeds some threshold, for example a threshold of 150 ACKs. The threshold is somewhat arbitrary and its value is optimized for the specific communications network. Generally, the value of the threshold determines when the transmitter may properly decide that a different error correction encoder is appropriate in order to increase the throughput of the existing channel. If the threshold is not exceeded, the transmitter inserts the error correction identifier into the header of the next data block to transmit and encodes the data block according to the existing error correction encoder. If the threshold is exceeded, the transmitter dynamically adapts the error correction encoder, to a less aggressive algorithm such as (63,54) Reed-Solomon for example, and resets the counter to zero. The transmitter then encodes the next data block with the new error correction encoder, transmits it to the receiver, whereby the receiver again decodes the transmitted reverse channel message block (18) according to all of the pre-determined error correction level algorithms. Presumably, the error correction encoder achieving parity is the less aggressive algorithm and the process iterates for all newly transmitted message blocks. If no parity is found for any of the error correction encoders or if the error correction identifier does not match the deciphered error correction identifier for the reverse channel message block achieving parity, the decode is unsuccessful. In the event of an unsuccessful decode, the receiver (2) sends a NAK to the transmitter (4). The transmitter (4) upon receiving one or more NAKs, changes the error correction encoder and resets the ACK counter to zero. The transmitter (4) then changes the error correction level identifier in the header of the message block, encodes the data block according to the new error correction encoder, and re-transmits the reverse channel message block (18). As one of ordinary skill in the art can appreciate, a dynamically adaptive system thus described automatically converts among appropriate error correction encoders/decoders to maximize throughput on an individual transmitter level. A system according to the teachings of the present invention, therefore, dynamically optimizes itself based upon existing transmission parameters as those transmission parameters may change, thereby maximizing overall channel throughput.

Other advantages of the invention are apparent from the detailed description by way of example, and from the accompanying drawings and from the spirit and scope of the appended claims.

We claim:

1. A method of data transfer between a transmitter and a receiver over a communications link comprising the steps of:

the transmitter transmitting a signal, the receiver receiving and measuring said signal, determining an error correction encoder as a function of the measured signal, the receiver transmitting an encoding identifier of the determined error correction encoder to the transmitter, the transmitter encoding a message according to the determined error correction encoder, the transmitter transmitting the encoded message, the receiver receiving the encoded message and decoding the message according to the determined error correction encoder.

2. A method of data transfer between a transmitter and a receiver over a communications link as recited in claim 1 wherein the step of transmitting an encoding identifier further comprises the step of transmitting error correction information for the determined error correction encoder to the transmitter.

3. A method of data transfer between a transmitter and a receiver over a communications link as recited in claim 1 wherein the error correction encoder is a Reed-Solomon encoder and wherein the encoding identifier comprises the number of Reed-Solomon errors to correct.

4. A method of data transfer between a transmitter and a receiver over a communications link as recited in claim 1 wherein the error correction encoder is a BCH encoder and wherein the encoding identifier comprises the number of BCH errors to correct.

5. A method of data transfer between a transmitter and a receiver over a communications link as recited in claim 1 wherein the error correction encoder is a convolutional encoder.

6. A method of data transfer between a transmitter and a receiver over a communications link as recited in claim 1 wherein the error correction encoder is a Reed-Solomon encoder and wherein the encoding identifier comprises the number of Reed-Solomon parity symbols.

7. A method of data transfer between a transmitter and a receiver over a communications link as recited in claim 1 wherein the error correction encoder is a BCH encoder and wherein the encoding identifier comprises the number of BCH parity symbols.

8. A method of data transfer between a transmitter and a receiver over a communications link as recited in claim 1 wherein the step of measuring the signal comprises measuring the signal to noise ratio of the signal transmitted by the transmitter as received by the receiver.

9. A method of data transfer between a transmitter and a receiver over a communications link as recited in claim 1 wherein the step of measuring the signal comprises measuring the absolute signal power of the signal transmitted by the transmitter as received by the receiver.

10. A method of data transfer between a transmitter and a receiver over a communications link as recited in claim 1 wherein the signal transmitted by the transmitter comprises a channel access request.

11. A method of data transfer between a transmitter and a receiver over a communications link as recited in claim 10 wherein the step of transmitting the encoding identifier of the determined error correction encoder to the transmitter is performed in a response to the channel access request.

12. A method of data transfer between a transmitter and a receiver over a communications link as recited in claim 11 wherein the response to the channel access request also includes a reservation grant.

13. A method of data transfer between a transmitter and a receiver over a communications link as recited in claim 1 wherein the signal transmitted by the transmitter is a message block.

14. A method of data transfer between a transmitter and a receiver over a communications link as recited in claim 13 wherein the step of transmitting the encoding identifier of the determined error correction encoder to the transmitter is performed in a response to the transmitted message block.

15. A method of data transfer between a transmitter and a receiver over a communications link as recited in claim 1 wherein the step of determining the error correction encoder comprises selection of an appropriate error correction encoder from a fixed plurality of predetermined error correction encoders.

16. A method of data transfer between a transmitter and a receiver over a communications link as recited in claim 15 wherein the transmitter uses the encoding identifier to acquire error correction encoder information for the determined error correction encoder from the plurality of predetermined error correction encoders.

17. A method of data transfer between a transmitter and a receiver over a communications link comprising the steps of:
(a) the transmitter transmitting a channel access request signal,
(b) the receiver receiving and measuring the signal to noise ratio of said channel access request signal,
(c) determining a number of Reed/Solomon error correction symbols as a function of the measured signal to noise ratio,
(d) transmitting a reservation grant and the determined number of Reed-Solomon error correction symbols to the transmitter,
(e) the transmitter encoding a Reed-Solomon encoded message block according to the determined number of Reed-Solomon error correction symbols,
(f) the transmitter transmitting the encoded message block,
(g) the receiver receiving the encoded message block and decoding the message block according to the determined number of error correction symbols.

18. A method of data transfer between a transmitter and a receiver, the transmitter and receiver having similar a prior knowledge of a plurality of error correction encoders and the error correction information associated with the error correction encoders comprising the steps of:
encoding a data block according to a first predetermined error correction encoder,
the transmitter transmitting the encoded data block,
the receiver receiving the encoded data block,
decoding the data block according to said first error correction encoder,
determining whether the data block was successfully decoded,
the receiver indicating to the transmitter whether the step of decoding the data block was successful or not,
the transmitter changing the error correction encoder to a second error correction encoder if the step of decoding was unsuccessful,
the transmitter changing the error correction encoder to a third error correction encoder if the step of decoding was successful.

19. A method of data transfer between a transmitter and a receiver as recited in claim 18 wherein the step of decoding the data block further comprises the steps of decoding the data block according to all of the predetermined error correction encoders.

20. A method of data transfer between a transmitter and a receiver as recited in claim 19 and further comprising the step of inserting an encoding identifier into the data block prior to the step of encoding the data block.

21. A method of data transfer between a transmitter and a receiver as recited in claim 18 and further comprising the step of inserting an encoding identifier into the data block prior to the step of transmitting the encoded data block.

22. A method of data transfer between a transmitter and a receiver as recited in claim 18 wherein the step of decoding the data block further comprising identifying a one or more of the predetermined error correction encoders that achieved parity in the decoding step and further comprising the step of the receiver deciphering the encoding identifier in the data blocks that were decoded for each of the one or more of the predetermined error correction encoders that achieved parity and comparing the one or more deciphered encoding identifiers with the identified error correction encoder that achieved parity.

23. A method of data transfer between a transmitter and a receiver as recited in claim 18 and further comprising the step of counting a number of consecutive indications of a successful step of decoding.

24. A method of data transfer between a transmitter and a receiver as recited in claim 23 wherein the step of the transmitter changing the error correction level further comprises the step of determining whether the number of consecutive indications of a successful step of decoding exceeds a predetermined threshold.

* * * * *

Disclaimer

6,009,553 - Dennis Martinez, Westford, Mass.; Thomas Hengeveld, Hollis, N.H.; Michael Axford, Groton, Mass. ADAPTIVE ERROR CORRECTION FOR A COMMUNICATIONS LINK. Patent dated December 28, 1999. Disclaimer filed February 19, 2016, by the inventors.

I hereby disclaim the following complete claims 1, 2, 5, 8 and 9 of said patent.

*(Official Gazette, September 6, 2022)*

(12) INTER PARTES REVIEW CERTIFICATE (375th)
United States Patent
Martinez et al.

(10) Number: US 6,009,553 K1
(45) Certificate Issued: Feb. 7, 2018

(54) ADAPTIVE ERROR CORRECTION FOR A COMMUNICATIONS LINK

(75) Inventors: Dennis Martinez; Thomas Hengeveld; Michael Axford

(73) Assignee: ORLANDO COMMUNICATIONS LLC

Trial Number:

IPR2015-01573 filed Jul. 16, 2015

Inter Partes Review Certificate for:

Patent No.: 6,009,553
Issued: Dec. 28, 1999
Appl. No.: 08/991,587
Filed: Dec. 15, 1997

The results of IPR2015-01573 are reflected in this inter partes review certificate under 35 U.S.C. 318(b).

INTER PARTES REVIEW CERTIFICATE
U.S. Patent 6,009,553 K1
Trial No. IPR2015-01573
Certificate Issued Feb. 7, 2018

AS A RESULT OF THE INTER PARTES REVIEW PROCEEDING, IT HAS BEEN DETERMINED THAT:

Claims 1, 2, 5, 8 and 9 are cancelled.

\* \* \* \* \*